Oct. 20, 1970  L. TRUXA  3,535,204
FOIL MOUNTING ARRANGEMENT IN A PAPER MACHINE
Filed Jan. 23, 1967

LESLIE TRUXA
INVENTOR

BY Eckersley
AGENT

United States Patent Office 3,535,204
Patented Oct. 20, 1970

3,535,204
FOIL MOUNTING ARRANGEMENT IN A
PAPER MACHINE
Leslie Truxa, Montreal, Quebec, Canada, assignor to Dominion Engineering Works, Limited, Quebec, Canada, a corporation of Canada
Filed Jan. 23, 1967, Ser. No. 610,922
Int. Cl. D21f 1/10
U.S. Cl. 162—352                                    3 Claims

ABSTRACT OF THE DISCLOSURE

A water extraction foil for a paper machine is slidably mounted in a slot extending in the cross-machine direction in fixed support structure, and the foil secured against tilting movement relative to the slot by at least one smooth circular rod inserted in the cross-machine direction within facing V-grooves formed in adjacent surfaces of the foil and the cross-machine slot.

---

Figure 1:
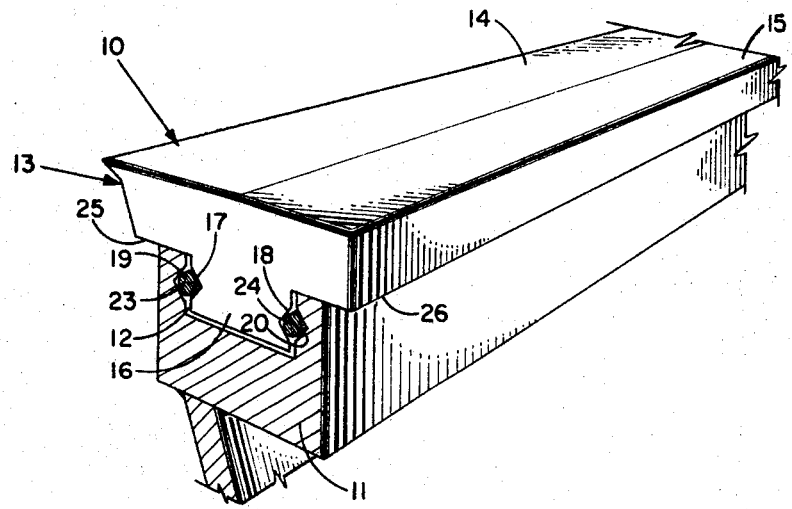

This invention is directed to an improved method of securing machine elements together, and to an improved joint structure, in particular a method of mounting drainage foils or scrapers in a paper machine, and to the improved foil structure.

Drainage foils and scrapers are provided in paper machines, being in the form of a narrow slat extending the full width of the paper machine generally located beneath the Fourdrinier wire in supporting and water stripping relation therewith. In order to obtain effective operation of these devices, particularly foils in their water stripping function it is imperative to secure the foil in fixed relation with its mounting, so that the angular relation between the foil surface and the adjacent surface of the Fourdrinier wire is not inadvertently altered. At the same time, owing to the wear which occurs on the surface of the foil owing to the passage of the Fourdrinier thereacross, it is necessary to be able to replace worn foils without taking the paper machine out of commission for any extended length of time.

In prior arrangements, such as that illustrated in Canadian Pat. 717,289 issued Sept. 7, 1965, the inventor being W. S. White et al., an arrangement is shown having a recessed foil member slidably mounted upon a T-shaped section. Such an arrangement suffers from a number of disadvantages, including the high cost of machining close fitting reentrant shapes in the foil, the complex shape of the support structure, and the difficulty experienced in mounting or dismounting the foil on its support by lateral sliding of the foil in a direction transverse to the motion of the Fourdrinier wire. When it is appreciated that foil lengths in the order of 20 feet are commonplace it will be understood that high friction forces must be overcome when replacing the foils.

An object of the present invention is to provide a simplified method of mounting machine elements in secured relation one with the other.

A further object of the present invention is to provide an improved foil mounting arrangement to facilitate ready foil replacement in a paper machine.

What I have provided is:

A method of holding a pair of elements, including a foil or scraper, in secured facing relation, one element having a projecting portion extending within a slideway in the other element facing the one element, including the steps of; providing a composite recess extending along at least a portion of the length of the slideway, one portion of the recess lying in a sidewall of the slideway, and an opposing portion of the recess lying in the surface of the projecting portion facing the sidewall; and inserting a rod-like element lengthwise into the recess for positive engagement against the respective outermost sides thereof relative to the respective elements, whereby vertical outward displacement of the projecting portions from the slideway is prevented by the longitudinal shearing resistance of the rod-like element.

Thus, there is provided in a machine having a foil element mounted in longitudinally sliding relation upon the support element, the improvement comprising element positioning means for positioning and retaining the foil element in mounted relation on the support element, including a slideway extending longitudinally in one of the elements in facing relation to the other element and having a first groove in at least one sidewall of the slideway, the other element having a portion thereof protruding within the open slideway and extending therein past the groove and having a second groove in the side thereof in at least partial correspondence with the first groove, and longitudinally extensive rod means located between the first and second grooves in close fitting relation therewith to provide accurate location of the foil element in relation to the fixed element, and to prevent upward withdrawal of the protruding portion from the slideway, whereby upon removal of the rod means the elements may be readily slidably disassembled. The invention further provides a dual arrangement of grooves having a pair of positioning rods slidably mounted therein to prevent withdrawal and to limit canting of the machine elements.

Figure 2:
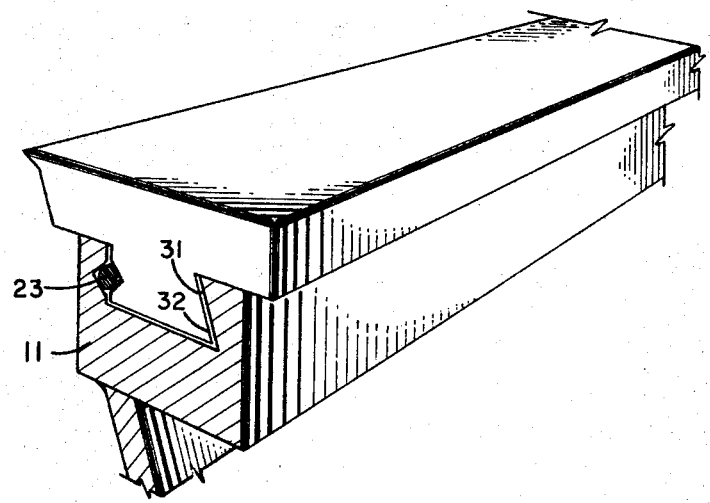

Certain embodiments of the present invention are described by way of example, reference being had to the accompanying drawings wherein:

FIG. 1 shows a first foil mounting embodiment according to the present invention; and FIG. 2 shows a second foil mounting embodiment according to the present invention.

Referring to FIG. 1, the foil mounting assembly 10 comprises a mounting base 11 having a recess 12 in which the foil 13 is mounted. The foil 13 includes a leading top surface 14 and a trailing top surface 15.

The improved foil mounting arrangement consists of an extending rib 16 of rectangular or semi-dovetail cross-section located within the recesses 12 which is of similar cross section, a pair of complementary mutually laterally spaced smooth surfaced V grooves 17, 18, to provide a rhombus-like section, in the sides of the rib 16 of substantially rectangular cross-section extending in the cross-machine direction for the width of the foil being in correspondence with corresponding smooth surfaced V-grooves 19 and 20 in the sidewalls of the recess 12 to form two laterally displaced keyways extending in the cross-machine direction. Smooth surfaced circular section rods 23, 24, generally of stainless steel in view of the wet environment, are inserted within the complementary recesses 17–19, 18–20.

It will be seen in the illustration that the under surfaces 25, 26 of the foil serve to support the foil upon the base 11.

In operation there is a tendency for the induced suction operating on the surface 15 to raise the trailing or back edge of the foil, so that it is imperative for the foil locating means to provide precise locating surfaces of sufficient capacity to withstand movement tendencies, thus assuring stabilized operation of the foil.

Referring to the embodiment shown in FIG. 2, a dovetail arrangement having a slanted surface 31 on the base 11 and a corresponding surface 32 on the rib of the foil enables the benefits of the present invention to be obtained by the use of a single wire 23. In this arrangement, if it is desired to provide a "drop-in" assembly and disassembly capability, the lateral displacement produced by the wire 23 must exceed the "batter" or vertical interference dimension of the dovetail.

In addition to effecting a low-cost, readily applied and accurately-made securing device, the present invention permits the use of non-swelling securing materials, permitting the use of extruded foil sections and rapid replacement of foils and locking rods. In addition minor variations in rod size may be readily effected to compensate for any variations in dimension in the foil or the holder.

It is also contemplated that the securing rods may have portions of smaller diameter alternating with full diameter portions, in order to reduce the force necessary to insert or withdraw the rods, and to make the rods more resilient, for facilitated handling.

In addition to the benefits of cost reduction, a further significant benefit is the reduction of down-time of the paper machine occasioned by the need for changing foils, and in some instances foils and scrapers may be changed while the machine continues to operate.

What I claim as new and desire to secure by Letters Patent of the United States is:

1. In a paper machine having a forming wire, a main foil element extending in the cross-machine direction beneath the wire in supporting relation therewith, foil support means slidably receiving said foil element in positioned relation relative to said wire, slideable means extending across the machine for securing said main element to said support element, said securing means including means defining a slideway extending longitudinally of one said element in the cross-machine direction, said other element having rib means in sliding mated relation within said slideway, said slideway and said rib means having a pair of opposed spaced surfaces extending in the cross-machine direction, means defining a first smooth surfaced V-groove in one said opposed surface extending in the cross-machine direction, means defining a second smooth surfaced V-groove in the other said opposed surface extending in the cross-machine direction to form with said first V-groove a keyway of rhombus-like section, and substantially circular section rod means located in said keyway in close fitting relation therewith to stabilize the foil rigidly relative to the wire, whereby upon removal of said rod means said elements may be readily separated.

2. A foil for a paper machine as claimed in claim 1 wherein said slideway and said rib means have a second pair of said spaced smooth surfaces extending in the cross-machine direction and displaced laterally from said first pair of spaced smooth surfaces, means defining co-operating V-grooves in mutual facing relation forming a keyway between said second pair of surfaces, and substantially circular section rod means located in said keyway to stabilize the foil rigidly relative to the wire.

3. A foil for a paper machine as claimed in claim 1 wherein said rib means is of substantially rectangular cross-section, said slideway being of corresponding section to provide side and bottom clearance from the rib, and having one said keyway extending in the cross-machine direction on each side of the rib, with said rod means located therein in foil securing and positioning relation.

References Cited

UNITED STATES PATENTS 3,337,394    8/1967    White et al.     162—352

FOREIGN PATENTS 811,619    8/1951    Germany.
337,516    11/1930    Great Britain.

S. LEON BASHORE, Primary Examiner

A. L. CORBIN, Assistant Examiner

U.S. Cl. X.R.

52—586; 162—374; 287—64, 104